No. 691,905. Patented Jan. 28, 1902.
H. HAMELLE.
LUBRICATING APPARATUS.
(Application filed Oct. 7, 1901.)

(No Model.)

WITNESSES:
René Phuine
Fred White

INVENTOR:
Henry Hamelle,
By his Attorneys
Arthur C. Fraser & Co.

UNITED STATES PATENT OFFICE.

HENRY HAMELLE, OF PARIS, FRANCE.

LUBRICATING APPARATUS.

SPECIFICATION forming part of Letters Patent No. 691,905, dated January 28, 1902.

Application filed October 7, 1901. Serial No. 77,818. (No model.)

*To all whom it may concern:*

Be it known that I, HENRY HAMELLE, a citizen of the Republic of France, residing in Paris, France, have invented certain new and useful Improvements in Lubricating Apparatus, of which the following is a specification.

This invention relates to apparatus for lubricating with oil, whereby one or more tubes, as desired, for conducting the oil to the surfaces to be lubricated can be fed with oil without loss.

According to the invention I provide the cylinder with a hollow piston which forces the oil to the organs to be lubricated, and the bottom of this hollow piston is provided with a spring-controlled valve, this valve being able to connect the cylinder of the lubricating apparatus and the inside of the hollow piston, so that the oil forced by the piston may escape into the inside of the said piston when the organs or working parts connected to the lubricating apparatus do not use a sufficient quantity of the so-forced oil.

To enable my invention to be fully understood, I will describe it by reference to the accompanying drawings.

Figure 1:
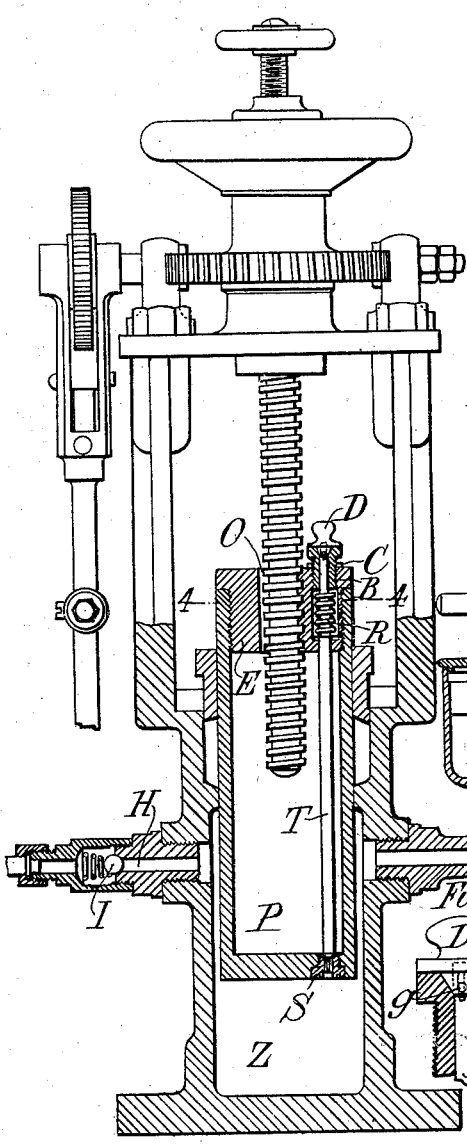
Figure 2:
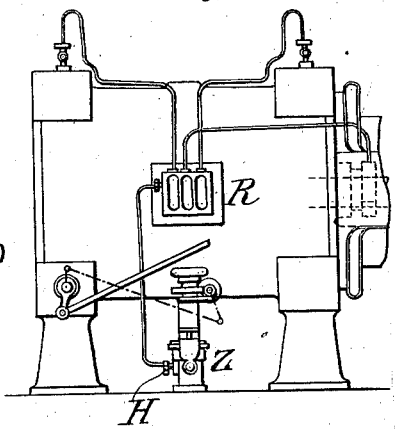
Figure 3:
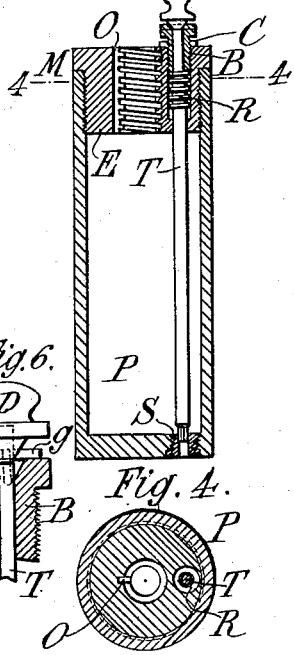
Figures 4, 5, 6:
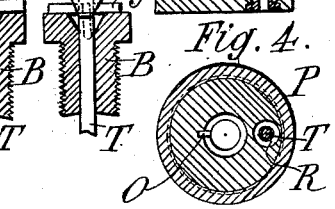

Figure 1 is a vertical section of this improved lubricating apparatus. Fig. 2 is a diagram of the lubricating apparatus combined with a collecting-distributer whose drop-tubes feed the oil in three directions to lubricate three organs or mechanisms. Fig. 3 is a vertical section of the piston of my apparatus. Fig. 4 is a horizontal section on line 4 4 of Figs. 1 and 3. Figs. 5 and 6 are sectional details showing the parts in different positions.

The cylinder Z contains the lubricant, which is introduced by the cup G, and a threaded pin with conical end closes the pipe which opens at the bottom of this cup. The lubricant is forced out by the hollow piston P, which is depressed by a screw rotating in a nut E, fixed in the piston. The screw rotates under the action of the mechanism exterior to the cylinder Z. The oil escapes through the passage H, provided with a ball-valve I, against a spring which applies this ball to its seat. The piston P is hollow and contains a rod T, whose inferior end is a valve which rests on the lower seat S. At the upper end the rod T is depressed by a spring R, the tension of which may be adjusted, and this spring maintains the valve applied against its seat. The tension of the spring R is adjusted so as to be conveniently superior to the tension in the cylinder acting on the valves. The tension of the spring is controlled by a threaded plug B, fixed in position by a nut C. In case the organs or parts to be lubricated do not use the oil forced out by the piston P, the pressure increases beneath the said piston, and in consequence the forced oil opens the valve T and penetrates inside the piston. The capacity of the piston is the same as the capacity of the cylinder Z. A slot O is formed in the thread of the nut E for the passage of the air that the piston contains in its inside.

The rod T has on its upper end a disengaging-head D, which has a transverse pin $g$, the ends of which rest in semicircular notches, formed in the superior surface of the plug B when the head is forced against the superior surface of the plug. When the head D is turned on a quadrant or ninety degrees, the pin $g$ rests no more in the notches and the head D is above the plug B, as seen on Fig. 3. In this position of the head D the valve which is at the inferior end of the rod T is above its seat in order to empty into the cylinder the lubricant contained in the hollow piston when the latter is drawn up.

Fig. 2 shows this lubricating apparatus applied to the cylinder of a steam-engine. The lubricating apparatus actuated by the motor feeds a collecting-distributer, provided with three drop-tubes, the latter supplying with oil, for instance, the stuffing-box of the piston-rod and the two slide-valves. These drop-tubes may be of any well-known or suitable construction for distributing the oil in predetermined quantities to the surfaces to be lubricated.

Having now particularly described the nature of my invention and in what manner the same is to be applied, I declare that what I claim is—

1. A lubricating apparatus comprising in combination a cylinder, a hollow forcing-piston in said cylinder, a valve adapted to open communication between said cylinder and said hollow piston, a spring holding said valve normally closed, whereby in case the pressure beneath the piston becomes excessive the valve may rise from its seat and admit oil inside the piston, and means for adjusting the pressure of said spring.

2. A lubricating apparatus comprising in combination a cylinder, a hollow forcing-piston in said cylinder, a valve adapted to open communication between said cylinder and said hollow piston, and a spring holding said valve normally closed, whereby in case the pressure beneath the piston becomes excessive the valve may rise from its seat and admit oil inside the piston.

3. A lubricating apparatus comprising in combination a cylinder, a hollow forcing-piston in said cylinder, a valve adapted to open communication between said cylinder and said hollow piston, a spring holding said valve normally closed, whereby in case the pressure beneath the piston becomes excessive the valve may rise from its seat and admit oil inside the piston, and means for lifting said valve in order to discharge the lubricant contained in the piston.

In witness whereof I have hereunto signed my name, this 16th day of September, 1901, in the presence of two subscribing witnesses.

HENRY HAMELLE.

Witnesses:
EDWARD P. MACLEAN,
AUGUSTE MATHIEU.